US009473397B2

(12) United States Patent
Driever et al.

(10) Patent No.: US 9,473,397 B2
(45) Date of Patent: Oct. 18, 2016

(54) USING INFORMATION ON A SUPPORTED ONE ZONE CONFIGURATION SETTING IN DATA FORWARDERS TO DETERMINE ZONE INFORMATION TO SEND TO DATA FORWARDERS

(71) Applicant: INTERNATIONAL BUSINESS MACHINES CORPORATION, Armonk, NY (US)

(72) Inventors: Patricia G. Driever, Poughkeepsie, NY (US); Roger G. Hathorn, Tucson, AZ (US); Henry J. May, Cedar Falls, IA (US); Daniel Sentler, Steinenbronn (DE); Bharath B. Somayaji, Bangalore (IN); Sudheer R. Yelanduru, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 293 days.

(21) Appl. No.: 14/171,710

(22) Filed: Feb. 3, 2014

(65) Prior Publication Data
US 2015/0222530 A1    Aug. 6, 2015

(51) Int. Cl.
*H04L 12/715* (2013.01)
*H04L 12/54* (2013.01)
(Continued)

(52) U.S. Cl.
CPC .......... *H04L 45/46* (2013.01); *H04L 12/5689* (2013.01); *H04L 67/2823* (2013.01); *H04L 45/44* (2013.01)

(58) Field of Classification Search
CPC ............. H04L 12/5689; H04L 45/46; H04L 67/2823; H04L 45/44

USPC ................. 370/390, 396, 400, 410
See application file for complete search history.

(56) References Cited

U.S. PATENT DOCUMENTS

2003/0163692 A1    8/2003   Kleinsteiber et al.
2005/0282565 A1*  12/2005   Shaheen ............. H04L 12/5895
                                                            455/466

(Continued)

FOREIGN PATENT DOCUMENTS

WO          2013118195          8/2013

OTHER PUBLICATIONS

PCT International Search Report and Written Opinion dated May 27, 2015, pp. 11, for Application No. PCT/IB2015/050811 filed Feb. 3, 2015.

(Continued)

*Primary Examiner* — Mark Rinehart
*Assistant Examiner* — Natali N Pascual Peguero
(74) *Attorney, Agent, or Firm* — Stosch Sabo; Robert Sullivan (57) ABSTRACT

Provided are computer program product, system, and method for determining whether a short or long message format is used to communicate zone information in a network. One large zone is implemented for end devices coupled to ports of data forwarders. A first formatted zoning distribution message is generated for the data forwarders identifying the data forwarder and ports on the data forwarders in the one large zone in response to determining that the data forwarder supports the short message format. A second formatted zoning distribution message is generated identifying the data forwarder, the ports on the data forwarders, and additional fields of information on the ports not included in the first formatted zoning distribution message in response to determining that the data forwarder does not support the short message format; and sending the generated first formatted or second formatted zoning distribution message to the data forwarder.

25 Claims, 8 Drawing Sheets

(51) Int. Cl.
*H04L 29/08* (2006.01)
*H04L 12/721* (2013.01)

(56) References Cited

U.S. PATENT DOCUMENTS

| | | |
|---|---|---|
| 2011/0135303 A1 | 6/2011 | Hufferd |
| 2012/0106957 A1 | 5/2012 | Willeke et al. |
| 2012/0254554 A1 | 10/2012 | Nakajima |
| 2012/0275301 A1 | 11/2012 | Xiong |
| 2012/0275787 A1 | 11/2012 | Xiong |
| 2013/0028135 A1 | 1/2013 | Berman |
| 2013/0272313 A1 | 10/2013 | Hathorn et al. |
| 2013/0287389 A1 | 10/2013 | Ayandeh |

OTHER PUBLICATIONS

U.S. Appl. No. 13/862,247, filed Apr. 2, 2013.
S. Wilson, et al., "Fibre Channel Switch Fabric-6 (FC-SW-6) Rev. 1.4", INCITS working draft proposed American National Standard for Information Technology, Nov. 26, 2013, pp. 387.
"Configuring Fibre Channel Zoning", CISCO, USC Manager CLI Configuration Guide, Release 1.2, pp. 10, 2004.
D. Fair, et al. ,"How VN2VN Will Help Accelerate Adoption of FCoE", Storage Networking Industry Association, pp. 35, 2013.

\* cited by examiner

Data Forwarder Entry

FIG. 3

Membership Distribution Message

FIG. 4

Membership Accept Response

FIG. 5

Zone Distribution Message

FIG. 6 Peering Descriptor

FIG. 7 Peering Entry

USING INFORMATION ON A SUPPORTED ONE ZONE CONFIGURATION SETTING IN DATA FORWARDERS TO DETERMINE ZONE INFORMATION TO SEND TO DATA FORWARDERS

BACKGROUND OF THE INVENTION

1. Field of the Invention

The present invention relates to a computer program product, system, and method for determining whether a short or long message format is used to communicate zone information in a network.

2. Description of the Related Art

A distributed switch includes a plurality of interconnected data forwarders that provide ports to interconnect end device ports, where an end device comprises a host, storage server, etc. In a distributed Fibre Channel Switch, a controlling switch is in communication with one or more Fibre Channel data forwarders (FCDFs) over a Fibre Channel network. In a distributed Fibre Channel over Ethernet (FCoE) switch, the controlling switch is a controlling FCoE forwarder (cFCF) and is in communication with one or more FCoE data forwarders (FDFs) over an Ethernet network. The data forwarders provide Fibre Channel or FCoE connections to end devices in a Fibre Channel or FCoE Fabric. The controlling switch maintains zone information for the network in which the distributed switch operates and updates the zone information of the data forwarders with changes to zone information or state of devices within the zone, such as the allocation and deallocation of N_Port_IDs for end points connected to data forwarders.

Fibre channel technology provides zoning that allows specification of which devices logged into the switch fabric or Storage Area Network (SAN) may communicate with which other devices. In a distributed switch, the controlling switch maintains zoning information for a Virtual Domain of the distributed switch. As end devices log into the distributed switch and are allocated N_Port_IDs belonging to the Virtual Domain, all of the data forwarders in the distributed switch must be informed of the zoning information as it pertains to the devices that are currently logged into the same Virtual Domain. This is done with a series of NPZD (N_Port_ID and Zoning ACL Distribution) requests from the controlling switch to each of the FCDFs in the distributed switch. Each of these requests carries a payload that describes a new N_Port ID allocation/deallocation and a list of all of the other N_Port_IDs currently allocated in the Virtual Domain and the data forwarders having zoning information affected by the allocation/deallocation, each containing a list of the other N_Port_IDs to which access is allowed However, the amount of zoning information in each NPZD message grows as additional end devices log into the data forwarders. The NPZD messages to the data forwarders can grow several factors in size and require numerous frames to transmit the NPZD message.

SUMMARY

Provided are computer program product, system, and method for determining whether a short or long message format is used to communicate zone information in a network. One large zone is implemented for end devices coupled to ports of data forwarders, wherein in the one large zone all the end devices coupled to the data forwarders can communicate with each other. For each of the data forwarders coupled to a controlling switch, operations are performed comprising: determining whether the data forwarder supports a short message format; generating a first formatted zoning distribution message identifying the data forwarder and ports on the data forwarders in the one large zone to which end devices are connected in response to determining that the data forwarder supports the short message format; generating a second formatted zoning distribution message identifying the data forwarder and the ports on the data forwarders in the one large zone and additional fields of information on the ports on the data forwarders in the one large zone not included in the first formatted zoning distribution message in response to determining that the data forwarder does not support the short message format; and sending the generated first formatted or second formatted zoning distribution message to the data forwarder.

DETAILED DESCRIPTION

Described embodiments provide techniques for determining whether to use a short or long message format when communicating zone information in a distributed switch environment managed by a controlling switch to which data forwarders are linked. The controlling switch determines through messages with the data forwarders support for an one large zone ("OLZ") OLZ short message format. One large zone may mean that no zoning exists and all end devices are considered part of the one large zone or that all currently active devices are in the same one zone. When reporting zone information upon detecting changes in the state of end devices connected to the data forwarders in a one large zone, the switch may send a short format zone information message to data forwarders that support the OLZ short message format, The OLZ short message format does not require that for each end device in the zone, a list is provided of the other end devices in the one large zone to which this end device may communicate. However, for those data forwarders that do not support the OLZ short message format, the switch sends a long format message that has additional information indicating for each end device in the one large zone the other end devices to which this end device may communicate.

Figure 1:
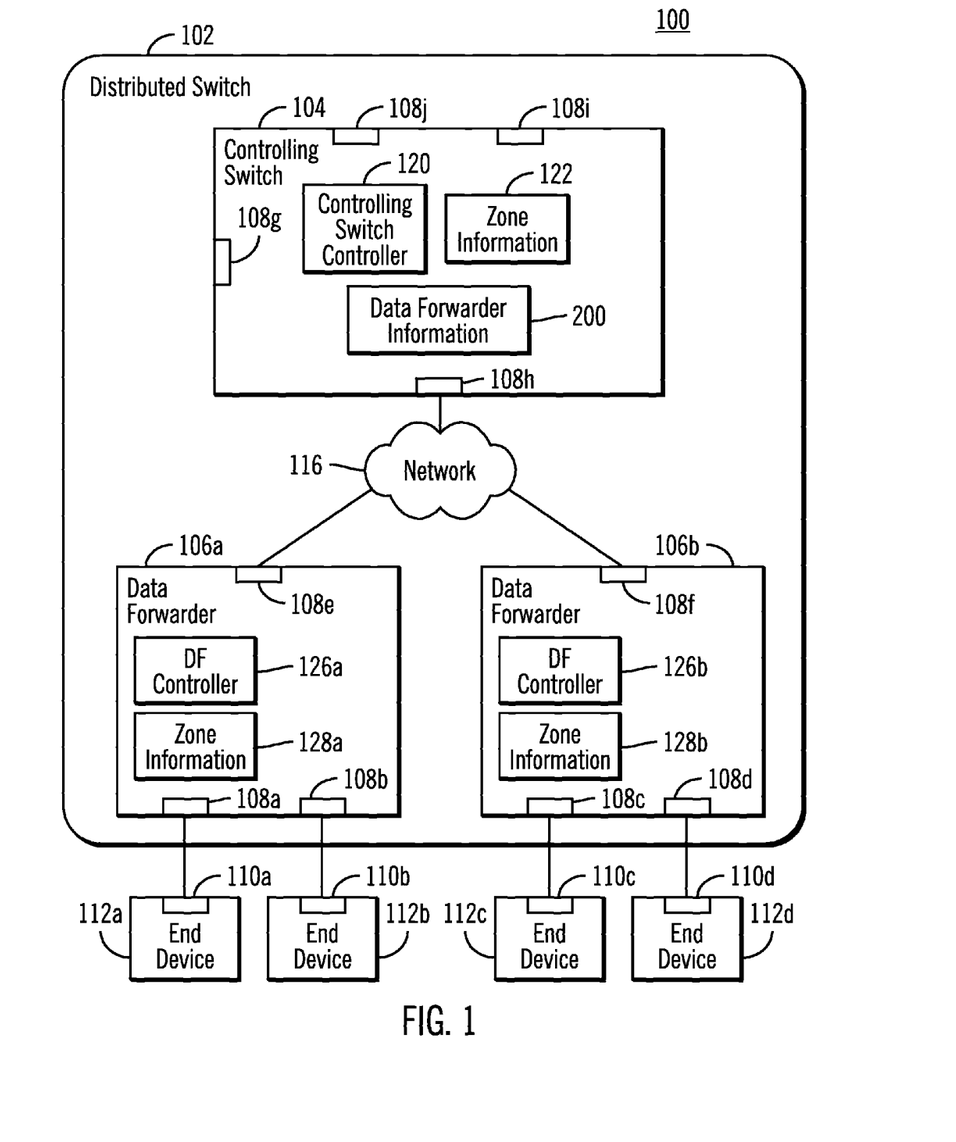
FIGS. 1 and 10 illustrate embodiments of a distributed switch.

FIG. 1 illustrates an embodiment of a network computing environment 100 including a distributed switch 102 comprised of a switch 104 and one or more coupled data forwarders 106a, 106b. The forwarders 106a, 106b include ports 108a, 108b, 108c, 108d, 108e, 108f, to connect to the switch 104 and to ports 110a, 110b, 110c, 110d of end devices 112a, 112b, 112c, 112d, respectively. In FCoE implementations, the switch 104 may include a port 108g to connect to a network fabric that is different from the network 116 between the switch 104 and the data forwarders 106a, 106b. The switch 104 communicates via port 108h with the data forwarders 106a and 106b over a network 116 via data forwarder ports 108e and 108f.

The switch 104 includes a switch (CF) controller 120 to perform the switch 104 operations; zone information 122 providing information on end devices on the coupled data forwarders and the end devices with which each port may communicate; and data forwarder information 200 on the data forwarders 106a, 106b in the distributed switch 102.

Each data forwarder 106a, 106b includes a data forwarder (DF) controller 126a, 126b and zone information 128a, 128b providing information on end devices in the network and the end devices with which each of these end devices in one or more zones may communicate.

The switch 104 manages zone information of end devices 112a . . . 112d that may communicate with other end devices in the network 100 for the distributed switch 102. When ports are allocated and deallocated in the network 100, the switch 104 transmits information on the end device updates to the data forwarders 106a, 106b so that the data forwarders 106a, 106b may update their local zone information 128a, 128b. The data forwarders 106a, 106b use their local zone information 128a, 128b to determine whether an end device port 110a-110d, transmitting data or a message, may communicate with the end device that is the target of the communication.

In one embodiment, the switch 104 may configure one large zone (OLZ) in which all end devices on the ports connected to the data forwarders 106a and 106b coupled to the switch 104 are in the same zone and may communicate with each other, i.e., any-to-any connectivity. Further, any end devices 112a, 112b, 112c, 112d, connected to the data forwarders 106a, 106b in the one large zone may communicate with end devices connected to any other of the forwarders 106a, 106b.

Although two data forwarders 106a, 106b and a certain number of ports and end devices are shown, there may be additional data forwarders, ports and end devices in the distributed switch 102 managed by the switch 104 and/or additional switches, to provide multiple switches connected to multiple data forwarders. Further, data forwarders may be directly linked to other data forwarders. Further, the distributed switch 102 may connect to additional distributed switches in the network. The end devices 112a-112d connected to the data forwarder ports 108a . . . 108d may comprise servers, initiators, targets, storage devices, etc.

In an FCoE embodiment when the network 116 comprises an Ethernet network, the switch 104 may separately communicate with a Fibre Channel Fabric and the forwarders 106a, 106b may communicate with the end devices 112a-112d using Fibre Channel or FCoE protocols. In such an FCoE embodiment, the switch 104 and data forwarders 106a, 106b communicate using a Fibre Channel over Ethernet (FCoE) protocol. In such Fibre Channel over Ethernet embodiments, the distributed switch 102 may comprise a distributed FCoE forwarder (Distributed FCF), the switch 104 may comprise a controlling FCoE forwarder (cFCF), and the data forwarders 106a, 106b may comprise FCoE data plane forwarders (FDFs). In a Fibre Channel embodiment, the network 116 may comprise Fibre Channel connections.

The ports may comprise physical ports or virtual ports providing Fibre Channel links. In certain embodiments, the ports 108h, 108i, and 108j connecting the forwarders 104, 106a, 106b may comprise Fibre Channel Virtual A ports (VA Ports), providing virtual links.

The CF 120 and DF 126a, 126b controllers may be implemented as an application specific integrated circuit (ASIC) or a processor executing computer readable program instructions in a non-volatile storage, or a combination thereof. In this way, the controllers 120, 126a, 126b include hardware to execute code or logic to perform the operations described herein. The controllers 120, 126a, 126b may include a volatile or non-volatile memory to store zone information 122, 128a, 128b, data forwarder information 200, and other information used during processing.

Figure 2:
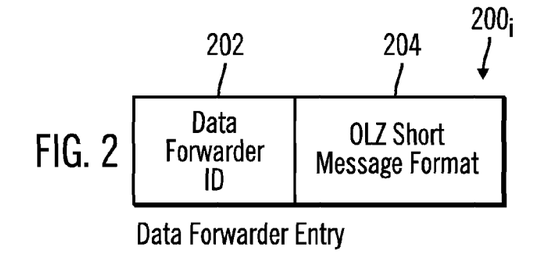
FIG. 2 illustrates an embodiment of a data forwarder entry for a data forwarder in data forwarder information.

FIG. 2 illustrates an embodiment of an instance of a data forwarder entry $200_i$ in the data forwarder information 200 maintained by the switch 104 for one of the coupled data forwarders 106a, 106b and includes a data forwarder identifier (ID) 202 and an OLZ short message format indicator 204 indicating whether the data forwarder supports the OLZ short message format.

Figure 3:
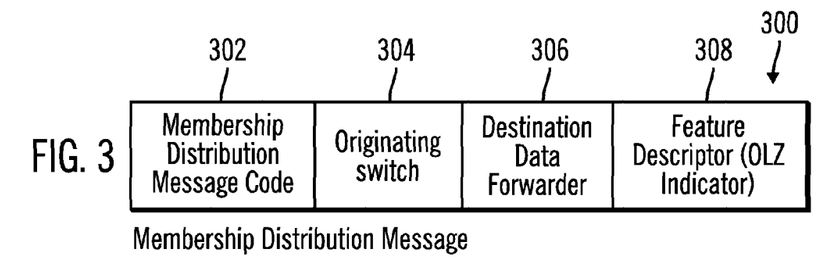
FIG. 3 illustrates an embodiment of a membership distribution message.

FIG. 3 illustrates an embodiment of a membership distribution message 300 used by the switch 104 to distribute information about the configuration of the distributed switch 102, such as when data forwarders 106a, 106b login or initialize with the switch 104. The message 300 includes a membership distribution message code 302; an originating switch 304 that generated and sent the message; the destination data forwarder 306 or port of the data forwarder to receive the message 300; and a feature descriptor 308 including an OLZ indicator indicating whether the OLZ short message format is supported. In a Fibre Channel implementation, the membership distribution message 300 may comprise a Distributed Switch Membership Distribution (DFMD) message modified to include the feature descriptor 308 and OLZ short message format indicator.

Figure 4:
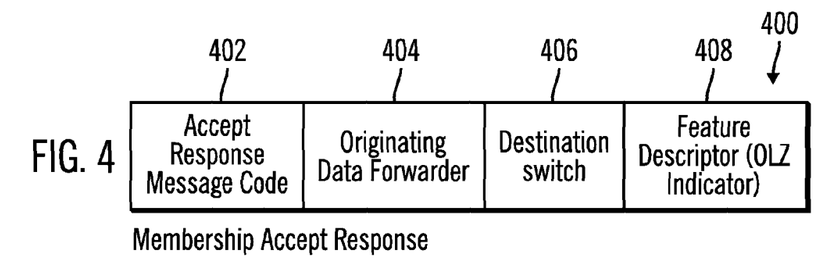
FIG. 4 illustrates an embodiment of a membership accept response.

FIG. 4 illustrates an embodiment of a membership accept response 400 sent by a data forwarder 106a, 106b in response to the membership distribution message 300 including an accept response message code 402; an originating data forwarder 404 that generated and sent the accept response 400; the destination switch 406 or port of the controlling switch to receive the message 400; and a feature descriptor 408 including an OLZ indicator which may be set to indicate that the OLZ short message format is supported. If the data forwarder 404 does not support the OLZ short message format, then the OLZ indicator may not be set by the data forwarder 404. In a Fibre Channel implementation, the accept response message 400 may comprise a Switch Fabric Link Service Accept message modified to include the OLZ short message format indicator 408.

Figure 5:
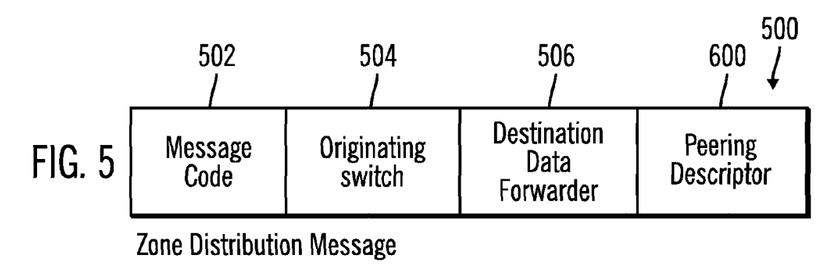
FIG. 5 illustrates an embodiment of a zone distribution message.

FIG. 5 illustrates an embodiment of zone distribution message 500 sent by the controlling switch 104 to each data forwarder 106a, 106b providing information on changes to the one large zone configuration including: message code 502 identifying the message; an originating data forwarder 504 that generated and sent the zone distribution message;

the destination data forwarder 506 to receive the message 500; and a peering descriptor 600 providing a list of entries of active end devices included in the one large zone. In a Fibre Channel implementation, the zone distribution message 500 may comprise a N_Port_ID and Zoning ACL Distribution (NPZD) Switch Internal Link Service (SW_ILS). Alternatively, the zone distribution message 500 may comprise an Active Zoning ACL Distribution (AZAD) message to report changes to the members of the zone for data forwarders already in the one large zone.

Figure 6:
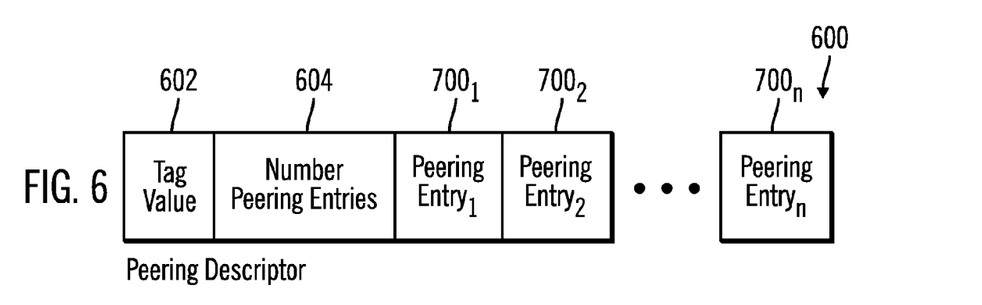
FIG. 6 illustrates an embodiment of a peering descriptor included in the zone distribution message.

FIG. 6 illustrates an embodiment of the peering descriptor 600 included in the zone distribution message 500, and including a tag value 602 identifying the peering descriptor; a number of peering entries 604; and one or more peering entries $700_1$, $700_2$ ... $700_n$ for each of the n end devices logged in through the data forwarders 106a, 106b

Figure 7:
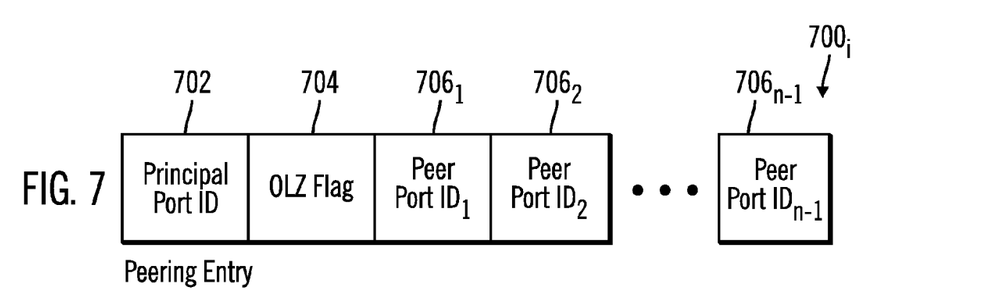
FIG. 7 illustrates an embodiment of a peering entry in the peering descriptor.

FIG. 7 illustrates an embodiment of a peering entry $700_i$ for one of the end devices ports logged in through on one of the data forwarders 106a, 106b including a principal port identifier (ID) 702 identifying the end device for which the information of the peering entry $700_i$ is provided; a one large zone (OLZ) flag 704 indicating whether the OLZ short message format is being used, and if set that the principal port 702 can communicate with any port in the one large zone; and n−1 entries $706_1$, $706_2$ ... $706_{n-1}$ for each peer port ID, identifying a port with which the principal port 702 connects. With the peering entry $700_i$, if the OLZ flag 704 is set indicating the OLZ short message format is being used, then no data would be provided for the peer ports $706_1$, $706_2$ ... $706_{n-1}$ because the principal port 702 can connect to all ports in the one large zone. Otherwise, if the OLZ flag 704 does not indicate that the OLZ short message format is used, then the peering descriptor includes the peering entries $706_1$, $706_2$ ... $706_{n-1}$. In this way, the OLZ short message format allows considerable space to be saved in the peering entry $700_i$ and the zone distribution message 500 in distributed switches having many data forwarders and hundreds of ports because the peering entry $700_i$ does not need to identify all the ports on the data forwarders, saving a considerable amount of bytes in the zone distribution message 500.

In one embodiment, if there are n ports in the one large zone, then the peering descriptor 600 includes n peering entries $700_1$ ... $700_n$, one for each port, where each peering entry $700_1$ ... $700_n$ for each of the ports, identified in the principal port ID 702, includes n−1 peer port IDs 706 ... $706_{n-1}$ if the OLZ short message format is not supported. In this way, if the OLZ short message format is supported, then by eliminating the peer port IDs, the message does not need to include the bytes for n*(n−1) peer port IDs.

The data structures shown in FIGS. 2-7 are shown to have certain fields of information. In further embodiments, these data structures may include additional fields, fewer fields than shown, and different fields or combine the information from multiple of the described fields into fewer fields or to expand the information in certain fields into a greater number of fields.

Figure 8:
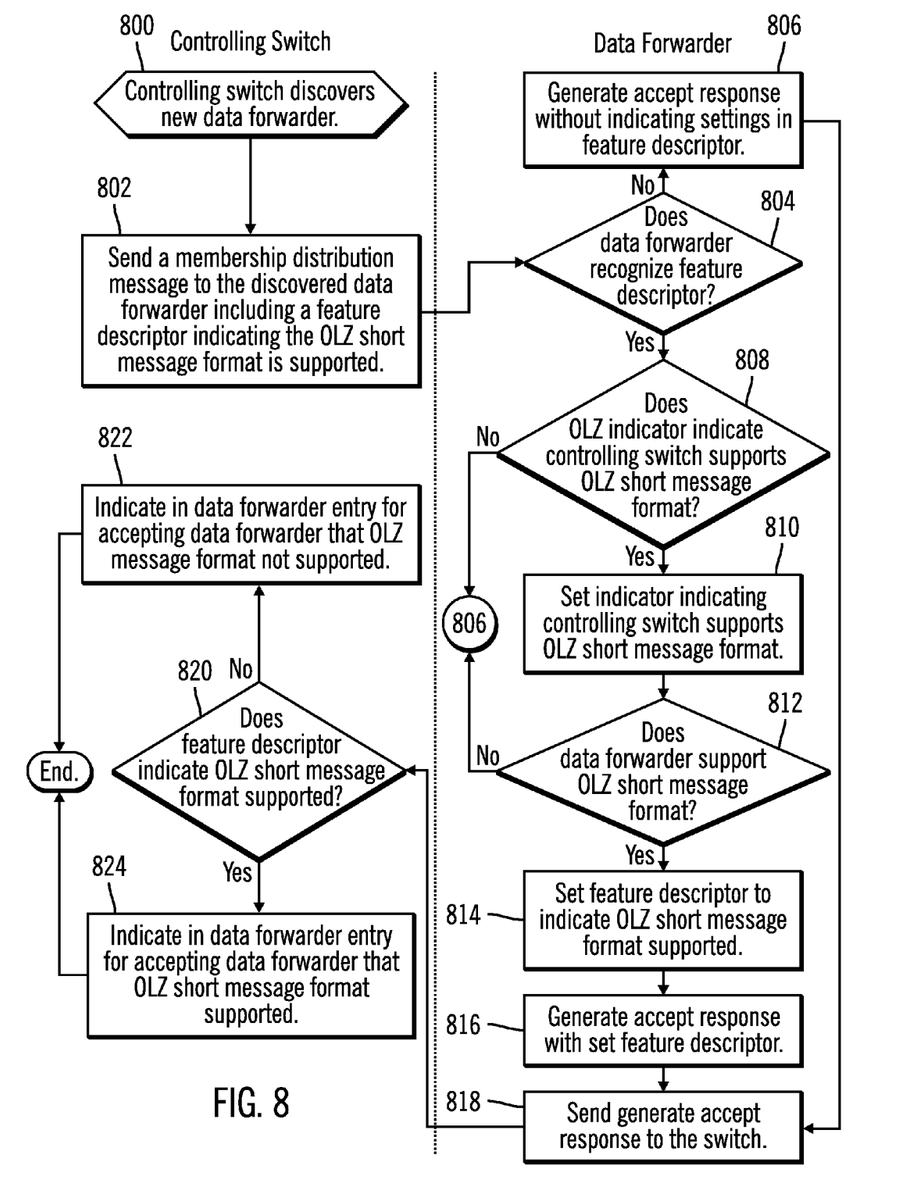
FIG. 8 illustrates an embodiment of operations to provide membership information to data forwarders coupled to the switch.

FIG. 8 illustrates an embodiment of operations performed by the switch controller 120 when discovering a data forwarder 106a, 106b to register the discovered data forwarder and discover whether the new data forwarder supports the OLZ short message format. Upon (at block 800) the switch controller 120 initiating operations to register a discovered data forwarder 106a, 106b, the switch controller 120 sends (at block 802) a member distribution message 300 to the discovered data forwarder 106a, 106b including a feature descriptor 308 including a field for an OLZ indicator indicating that the OLZ short message format is supported.

Upon the data forwarder 106a, 106b receiving (at block 804) the membership distribution message 300, if the DF controller 126a, 126b does not recognize or support (at block 804) the feature descriptor 308, then the DF controller 126a, 126b generates (at block 806) an accept response 400 without setting any information for the feature descriptor 408 because it is not supported, i.e., it ignores the field for the feature descriptor 408.

Otherwise, if (at block 804) the DF controller 126a, 126b recognizes the feature descriptor 308, then the DF controller 126a, 126b determines (at block 808) whether the OLZ indicator in the feature descriptor 408 indicates that the sending controlling switch 104 supports the OLZ short message format. If not, control proceeds to block 806 to return the accept response 400 without indicating in the feature descriptor 308 that the short message format is supported. Otherwise, if (at block 808) the controlling switch 104 supports the OLZ short message format, then the DF controller 126a, 126b sets (at block 810) an indicator in the data forwarder 106a, 106b that the controlling switch 104 supports the OLZ message format. If (at block 812) the data forwarder 106a, 106b supports the OLZ short message format, then the DF controller 126a, 126b sets (at block 814) the OLZ indicator in the feature descriptor 408 in the accept response 400 to indicate that the OLZ short message format is supported. The accept response 400 with the set OLZ indicator in the feature descriptor 408 is generated (at block 816). The accept response generated at block 806 or 816 is sent (at block 818) back to the controlling switch 104 that sent the member distribution message 300. If (at block 812) the data forwarder 106a, 106b does not support the OLZ message format, then control proceeds to block 806.

Upon (at block 820) the switch controller 120 determining that the feature descriptor 408 in the accept response 400 does not indicate that the OLZ short message format is supported at the sending data forwarder 106a, 106b, the switch controller 120 indicates (at block 822) in the OLZ setting 204 in the data forwarder entry $200_i$ in the data forwarder information 200 for the sending data forwarder 106a, 106b that the OLZ short message format is not supported for that sending data forwarder 106a, 106b Otherwise, the switch controller 120 indicates (at block 824) in the OLZ setting 204 in the data forwarder entry 200i in the data forwarder information 200 for the sending data forwarder 126a, 126b that the OLZ short message format is supported for that sending data forwarder 106a, 106b.

Figure 9:
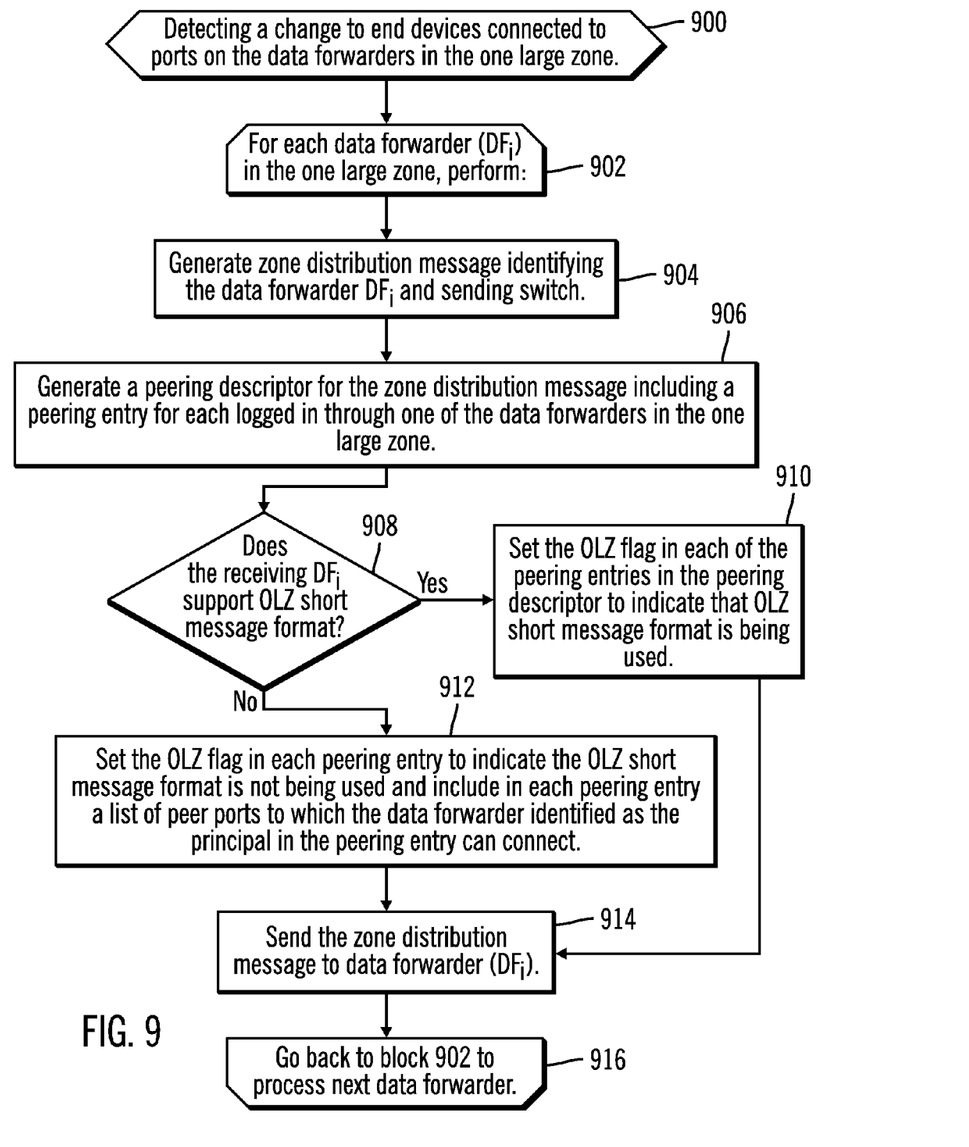
FIG. 9 illustrates an embodiment of operations to send a zone distribution message for a change to the data forwarders in a one large zone.

FIG. 9 illustrates an embodiment of operations performed by the switch controller 120 upon detecting a change in the state of end devices 112a, 112b, 112c, 112d connected to the ports 108a, 108b, 108c, 108d on the data forwarders 106a, 106b, such as addition and deletion of end devices, to distribute information on the new zone configuration to the data forwarders 126a, 126b. Upon detecting (at block 900) a change to the end devices connected to the data forwarders 106a, 106b in the one large zone, the switch controller 120 performs a loop at blocks 902 through 916 of the operations at blocks 904 through 914 for each of the data forwarders 126a, 126b (DF$_i$) with end devices logged into the controlling switch 104. At block 904, a zone distribution message 500 is generated identifying the data forwarder DF$_i$ to receive the message 500 as the destination data forwarder 506 and identifying the sending controlling switch 104 as the originating controlling switch 504. A peering descriptor 600 is generated (at block 906) to include in the zone distribution message 500, which includes a peering entry $700_i$ for each port logged in through one of the data forwarders in the one large zone. The switch controller 120 may determine the data forwarders in the one large zone, i.e., all data forwarders 126a, 126b with end devices logged into the controlling switch 104, in the data forwarder information 200.

If (at block 908) the data forwarder entry $200_i$ indicates that the data forwarder $DF_i$ supports the OLZ short message format as indicated in the OLZ setting 204 for the entry $200_i$, then the switch controller 120 sets (at block 910) the OLZ flag 704 in each of the peering entries $700_1 \ldots 700_n$ to indicate that the OLZ short message format is being used. When the flag 704 indicates that OLZ short message format is being used, then the switch controller 120 does not include fields and information for each of the peer port IDs $706_1 \ldots 706_{n-1}$ in each of the n peering entries $700_1 \ldots 700_n$ for the n ports because the OLZ flag 704 indicates that the OLZ short message format is being used for the data forwarder $DF_i$.

Otherwise, if (at block 908) the data forwarder $DF_i$ being considered does not support the OLZ short message format indicated in the OLZ setting 204 for the entry $200_i$, then the switch controller 120 includes (at block 912) a list of peer ports IDs $706_1 \ldots 706_{n-1}$ in each of the peering entries $700_1 \ldots 700_n$ identifying end devices in the one large zone with which the other end devices can communicate. The OLZ flag 704 may also be set to indicate that the short message format is not being used. The generated zone distribution message 500 with or without the peer port IDs $706_1 \ldots 706_{n-1}$, i.e., long or not long, is then sent to the data forwarder $DF_i$.

In this way the zone distribution message 500 has one of two message formats depending on whether the OLZ flag 704 for the data forwarder $DF_i$ indicates whether the OLZ short message format is used. In a first short message format where the OLZ flag 704 indicates that the OLZ short message format is used, the zone distribution message 500 does not include the list of n−1 peer ports IDs $706_1 \ldots 706_{n-1}$ in each of the n peering entries $700_1 \ldots 700_n$, which saves considerable number of bytes in the message 500. The number of bytes that are saved would comprise the number of bytes in each of the peer port IDs $706_1 \ldots 706_{n-1}$ times the number of peering entries $700_1 \ldots 700_n$, e.g., n*(n−1) entries. If each peer port ID field is four bytes and there are hundreds of ports, then the short message format can save a considerable number of bytes. In a second long message format where the OLZ flag 704 indicates that the OLZ short message format is not used, then the zone distribution message 500 includes the peer ports ID fields $706_1 \ldots 706_{n-1}$ in each of the peering entries $700_1 \ldots 700_n$.

Figure 10:
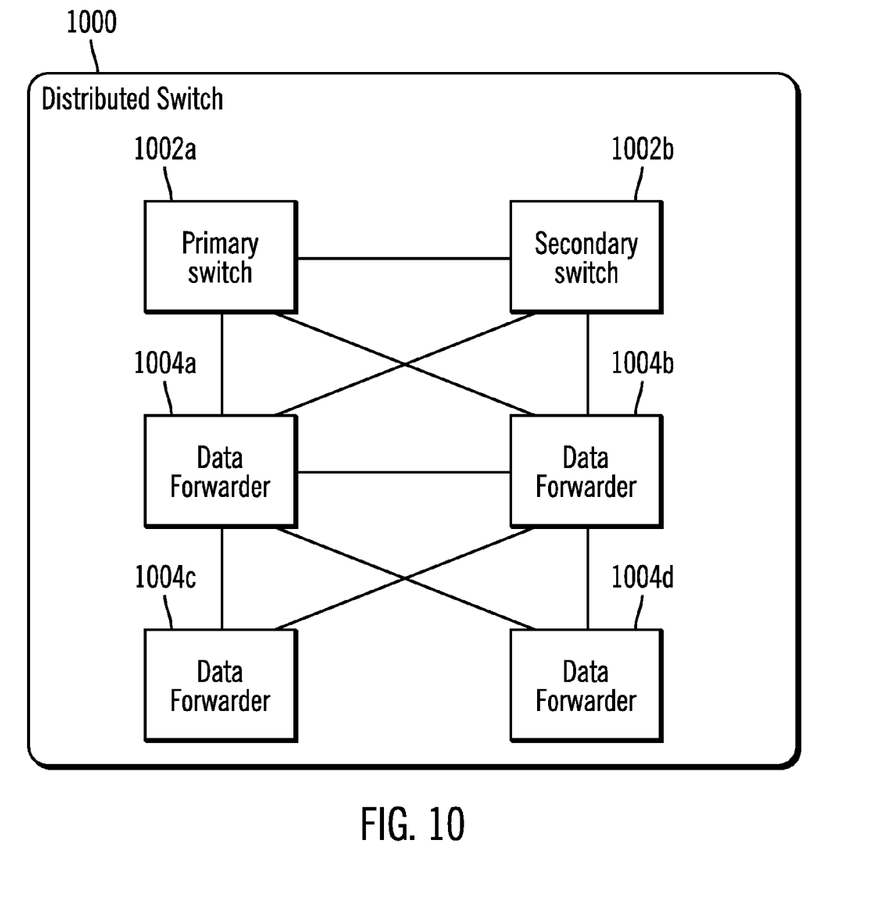

FIG. 10 illustrates an embodiment of a distributed switch 1000 including a primary controlling switch 1002a and a secondary controlling switch 1002b directly linked to data forwarders 1004a and 1004b. Additional data forwarders 1004c and 1004d are directly linked to data forwarders 1004a and 1004b, but not directly linked to the ports of the controlling switches 1002a, 1002b. The links between the forwarders 1002a, 1002b, 1004a, 1004b, 1004c, and 1004d may comprise A_Port links in a Fibre Channel implementation. FIG. 10 illustrates a cascaded data forwarder environment, where there are multiple levels of data forwarders connected to one another. The controlling switches 1002a, 1002b may include the architecture described with respect to the controlling switch 104 and the data forwarders 1004a, 1004b, 1004c, 1004d may include the architecture described with respect to the data forwarders 106a, 106b in FIG. 1.

Figure 11:
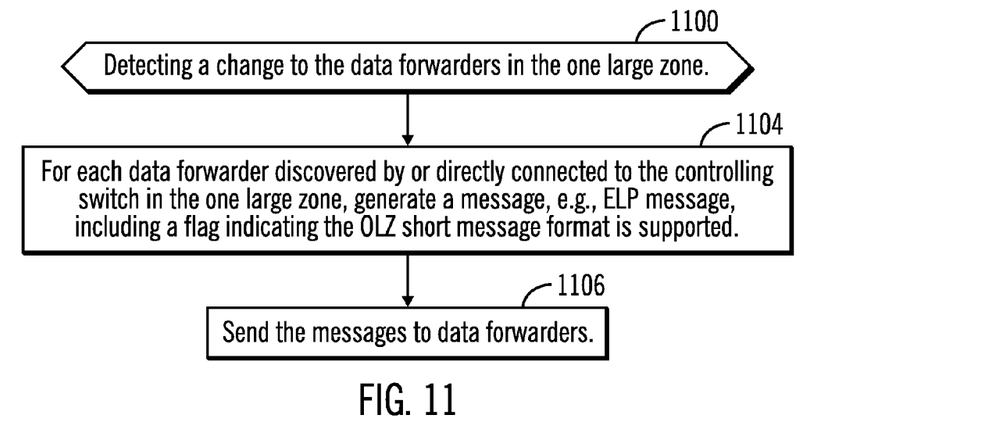
FIG. 11 illustrates an embodiment of operations to process a change to the one large zone configuration.

FIG. 11 is an alternative embodiment of operations performed by the controlling switch 1002a, 1002b to provide information on the zone to the forwarders 1004a, 1004b in the distributed switch 1000. Upon detecting (at block 1100) a change to the data forwarders included in the one large zone managed by the controlling switches 1002a, 1002b, the primary controlling switch 1002a generates (at block 1104), for each data forwarder discovered by and directly or indirectly connected to the controlling switch 1002a, 1002b in the one large zone, a message, such as an exchange link parameter message (ELP) in Fibre Channel embodiments, including a flag indicating that the OLZ short message format is supported and sends (at block 1106) the generated messages to the data forwarders 1106. In alternative embodiments, the message may be in a format other than the Fibre Chanel ELP format.

Figure 12:
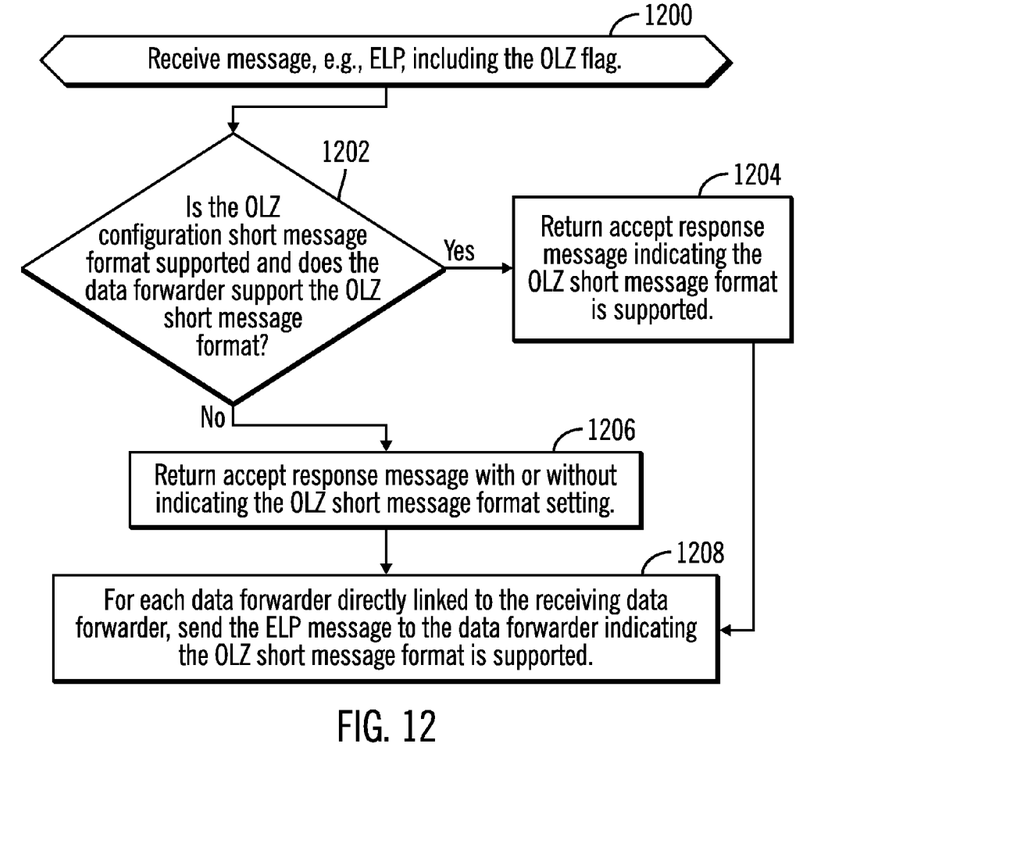
FIG. 12 illustrates an embodiment of operations for a data forwarder to process a message sent according to the operations of FIG. 11.

FIG. 12 illustrates an embodiment of operations performed by the data forwarders 1004a and 1004b receiving the ELP message from the primary controlling switch 1002a to process the ELP message indicating the OLZ feature setting. Upon receiving (at block 1200) the ELP message including the OLZ flag, if (at block 1202) the OLZ flag in the message indicates that the OLZ short message format is supported and the data forwarder supports the OLZ short message format, then the data forwarder 1002a, 1002b returns (at block 1204) an accept response message indicating that the OLZ short message format is supported at the sending data forwarder 1002a, 1002b. Otherwise, if (at block 1202) the OLZ short message format is not supported, then the data forwarder 1002a, 1002b returns (at block 1206) an accept response message with or without providing information for the OLZ indicator, which absence of information may indicate that the short message format is not supported at the sending data forwarder 1002a, 1002b. A data forwarder 1004a, 1004b being directly linked to other data forwarders, e.g., 1004c, 1004d, may further send (at block 1208), for each data forwarder 1004c, 1004d directly linked to the receiving data forwarder 1004a, 1004b, the ELP message indicating that the OLZ short message format is supported. In this way, a data forwarder linked to other data forwarders sends the ELP message providing information on the support for the OLZ short message format to the directly linked data forwarders to ensure the information is disseminated to data forwarders not directly linked to the controlling switches 1002a, 1002b. There may be additional data forwarders directly linked to the data forwarders 1004c, 1004d, and in such case the data forwarders 1004c, 1004d would need to send the ELP message to the below data forwarders to obtain information on whether those further below linked data forwarders support the OLZ short message format.

Figure 13:
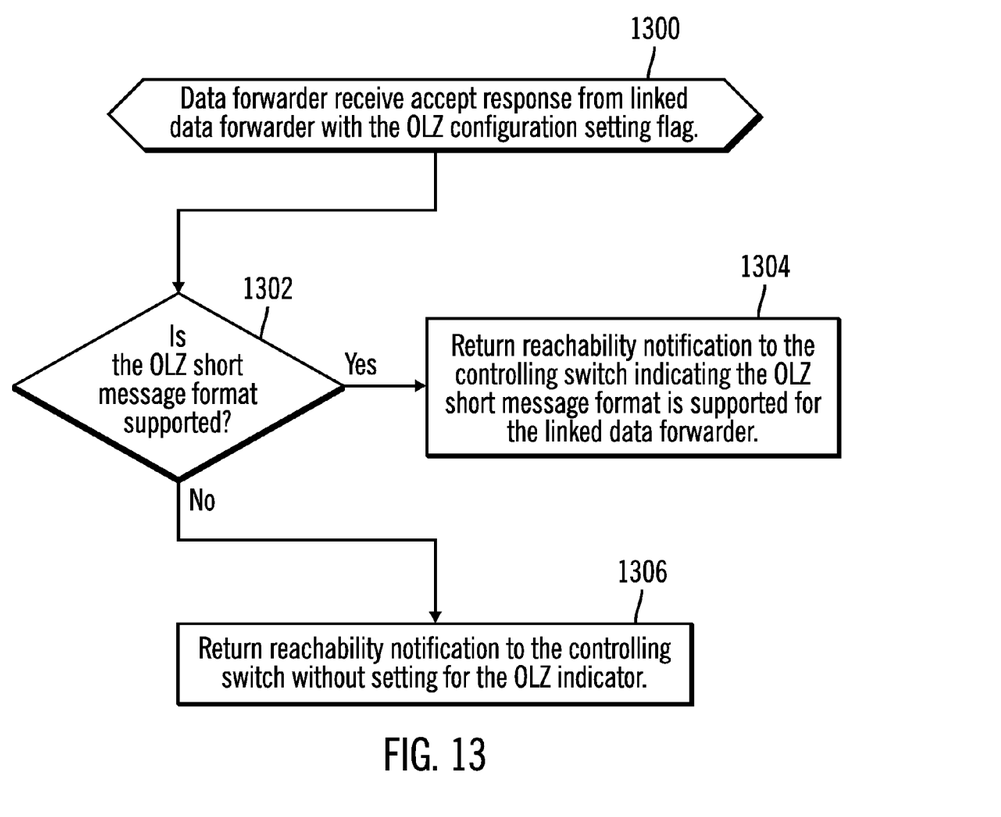
FIG. 13 illustrates an embodiment of operations for a data forwarder to process an accept response from a linked data forwarder.

FIG. 13 illustrates an embodiment of operations performed by the data forwarders 1002a, 1002b that sent the ELP message indicating the OLZ short message format support to lower linked data forwarders 1004a, 1004b, 1004c, 1004d to return the information from the lower linked data forwarders 1004a, 1004b, 1004c, 1004d back up to the controlling switch 1002a, 1002b downward data forwarders disseminate the information downward. Upon the data forwarder 1004a, 1004b receiving (at block 1300) an accept response from the lower linked data forwarder 1004c, 1004d, not directly linked to the controlling switches 1002a, 1002b, from the ELP message sent according to the operations of FIG. 12, if the accept response indicates (at block 1302) that the OLZ short message format is supported, then the data forwarder 1004a, 1004b returns (at block 1304) a reachability notification to the primary controlling switch 1002a indicating that the OLZ short message format is supported. If the accept response indicates (at block 1302) that OLZ short message format is not supported, then the data forwarder 1004a, 1004b returns (at block 1304) a reachability notification to the primary controlling switch 1002a indicating that the OLZ short message format is not supported. The reachability notification may further indicate the local port on the data forwarder 1004a, 10024 and the port on the linked data forwarder 1004c, 1004d.

With the operations of FIGS. 11-13, the primary controlling switch 1002a receives information on those data forwarders 1004a, 1004b, 1004c, 1004d that support the OLZ short message format, including for data forwarders 1004c, 1004d that are not directly linked to ports on the controlling switches 1002a, 1002b. The primary controlling switch 1002a can then update the data forwarder information 200 on those data forwarders 1004a, 1004b, 1004c, 1004d that support the OLZ short message format. This allows the controlling switches 104, 1002a, 1002b to generate zone distribution messages 500 having peering entries $700_1 \ldots 700_n$ with the OLZ flag 704 set to indicate the OLZ short message format which indicates that the peering entries $700_1 \ldots 700_n$ do not include the peer port IDs $706_1 \ldots 706_{n-1}$. This elimination of the peer port IDSs saves considerable space in the zone distribution message 500. Otherwise, if the OLZ short message format 204 in the data forwarder information $200_i$ for a data forwarder 126a, 126b, 1004a, 1004b, 1004c, 1004d indicates that the OLZ short message format is not supported, then the controlling switch 104, 1002a, 1002b needs to separately include all the peer port IDs $706_1 \ldots 706_n$ in each of the peering entries $700_1 \ldots 700_n$, which greatly increases the size of the zone distribution message 500 in one large zone having hundreds of data forwarders.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing a controlling switch coupled to data forwarders having ports with which end devices are coupled in a network, the computer program product comprising a computer readable storage medium, wherein the computer readable storage medium is not a transitory signal per se, the computer readable storage medium having computer readable program code embodied therein that executes to perform operations, the operations comprising:

implementing one large zone for the end devices coupled to the ports of the data forwarders, wherein in the one large zone all the end devices coupled to the data forwarders can communicate with each other;

for each of the data forwarders coupled to the controlling switch, performing operations, the operations comprising:

determining whether the data forwarder supports a short message format, wherein the short message format comprises a peering descriptor having a plurality of peering entries corresponding to respective end devices coupled to respective ports of a respective data forwarder;

generating a first formatted zoning distribution message in the short message format identifying the data forwarder and ports on the data forwarders in the one large zone to which end devices are connected in response to determining that the data forwarder supports the short message format;

generating a second formatted zoning distribution message identifying the data forwarder and the ports on the data forwarders in the one large zone and additional fields of information on the ports on the data forwarders in the one large zone not included in the first formatted zoning distribution message in response to determining that the data forwarder does not support the short message format; and sending the generated first formatted or second formatted zoning distribution message to the data forwarder.

2. The computer program product of claim 1, wherein the second formatted zoning distribution message includes for each of the ports in the one large zone on which an end device is connected a peering entry identifying each of other ports in the one large zone with which the end device on the port, for which the peering entry is provided, can communicate with in the one large zone.

3. The computer program product of claim 2, wherein the first formatted zoning distribution message includes in the peering entry for each of the ports in the one large zone to which an end device is connected a flag indicating that the port for which the peering entry is provided can communicate with all ports in the one large zone having connected end devices; and wherein respective peering entries in the first formatted zoning distribution message do not identify respective peer ports to a respective port of the data forwarder to which an end device is connected for which a respective peering entry is provided.

4. The computer program product of claim 3, wherein the second formatted zoning distribution message includes in the peering entry a field identifying each port having the connected end device in the one large zone with which the port, for which the peering entry is provided, can communicate.

5. The computer program product of claim 1, wherein the operations further comprise:
maintaining, for each data forwarder coupled to the controlling switch, information indicating whether the data forwarder supports the short message format, wherein the data forwarder information is used to determine whether each data forwarder supports the short message format.

6. The computer program product of claim 1, wherein the operations further comprise:
sending a membership distribution message to a discovered data forwarder indicating the short message format is supported;
receiving an accept response including a field of information indicating whether the discovered data forwarder supports the short message format; and
indicating in data forwarder information for the discovered data forwarder that the discovered data forwarder supports or does not support the short message format based on indication in the field of information in the accept response.

7. The computer program product of claim 1, wherein the operations further comprise:
sending a message to a first data forwarder of the data forwarders in the network indicating that the short message format is supported, wherein a first port on the first data forwarder is connected to a port on the controlling switch and a port on a second data forwarder is connected to a second port on the first data forwarder, wherein no second data forwarder port is directly connected to a port on the controlling switch;
receiving from the first data forwarder an accept response indicating whether the first data forwarder supports the short message format; and
indicating in data forwarder information for the first data forwarder that the first data forwarder supports or does not support the short message format based on whether the accept response indicates whether the short message format is accepted.

8. The computer program product of claim 7, wherein the message comprise a first message and the accept response comprises a first accept response, wherein the first data forwarder sends a second message indicating that the first data forwarder supports the short message format, and wherein the first data forwarder receives a second accept response from the second data forwarder indicating whether the second data forwarder supports the short message format, wherein the operations further comprise:
receiving a reachability message from the first data forwarder identifying the second data forwarder and indicating whether the second data forwarder supports the short message format.

9. A computer program product for managing data forwarders having ports with which end devices and a controlling switch are coupled in a network, the computer program product comprising a computer readable storage medium, wherein the computer readable storage medium is not a transitory signal per se, the computer readable storage medium having computer readable program code embodied therein that executes to perform operations, the operations comprising:
receiving a message from the controlling switch to communicate in a one large zone configuration, wherein in the one large zone all the end devices coupled to the ports of the data forwarders can communicate with each other, wherein the message comprises a membership distribution message received in response to being discovered by the controlling switch;
receiving a zone distribution message identifying all the ports in the data forwarders coupled to the controlling switch communicating in the one large zone and including a peering entry for each of the ports on the data forwarders, wherein the peering entry for each of the ports includes a flag indicating that entries for other of the ports on the data forwarders are not listed;
determining whether the message indicates that a short message format is supported;
generating an accept response indicating that the short message format is supported in response to determining that the message indicates that the short message format is supported; and
returning the accept response to the controlling switch.

10. The computer program product of claim 9, wherein the message comprises a first message, wherein the accept response comprises a first accept response, wherein the operations further comprise:
communicating with the controlling switch on a first port directly linked to a port on the controlling switch;
communicating with a second data forwarder on a second port linked to a port on the second data forwarder, wherein the second data forwarder port is directly connected to a port on the controlling switch;
sending a second message to the second data forwarder indicating that the short message format is supported;
receiving a second accept response from the second data forwarder indicating including a field of information to indicate whether the short message format is supported; and
sending a reachability message to the controlling switch identifying the second data forwarder and indicating whether the second data forwarder supports the short message format.

11. The computer program product of claim 9, wherein the short message format comprises a peering descriptor having a plurality of peering entries corresponding to respective end devices coupled to respective ports of respective data forwarders in the one large zone; and
wherein respective peering entries in the short message format do not identify respective peer ports to a respective port of a respective data forwarder to which an end device is connected for which a respective peering entry is provided.

12. A system coupled in a network to data forwarders having ports with which end devices are coupled, comprising:
a processor; and
a computer readable storage medium having computer readable program code executed by the processor to perform operations, the operations comprising:
implementing one large zone for the end devices coupled to the ports of the data forwarders, wherein in the one large zone all the end devices coupled to the data forwarders can communicate with each other;
for each of the coupled data forwarders, performing operations, the operations comprising:
determining whether the data forwarder supports a short message format wherein the short message format comprises a peering descriptor having a plurality of peering entries corresponding to respective end devices coupled to respective ports of a respective data forwarder in the one large zone;

generating a first formatted zoning distribution message in the short message format identifying the data forwarder and ports on the data forwarders in the one large zone to which end devices are connected in response to determining that the data forwarder supports the short message format;

generating a second formatted zoning distribution message identifying the data forwarder and the ports on the data forwarders in the one large zone and additional fields of information on the ports on the data forwarders in the one large zone not included in the first formatted zoning distribution message in response to determining that the data forwarder does not support the short message format; and sending the generated first formatted or second formatted zoning distribution message to the data forwarder.

13. The system of claim 12, wherein the second formatted zoning distribution message includes for each of the ports in the one large zone on which an end device is connected a peering entry identifying each of other ports in the one large zone with which the end device on the port, for which the peering entry is provided, can communicate with in the one large zone.

14. The system of claim 13, wherein the first formatted zoning distribution message includes in the peering entry for each of the ports in the one large zone to which an end device is connected a flag indicating that the port for which the peering entry is provided can communicate with all ports in the one large zone having connected end devices; and wherein respective peering entries in the short message format do not identify respective peer ports to a respective port of the data forwarder to which an end device is connected for which a respective peering entry is provided.

15. The system of claim 12, wherein the operations further comprise:

maintaining, for each coupled data forwarder, information indicating whether the data forwarder supports the short message format, wherein the data forwarder information is used to determine whether each data forwarder supports the short message format.

16. A system having ports with which end devices and a controlling switch are coupled in a network, wherein the network further includes data forwarders, comprising:

a processor; and a computer readable storage medium having computer readable program code embodied therein executed by the processor to perform operations, the operations comprising:

receiving a message from the controlling switch to communicate in a one large zone configuration, wherein in the one large zone all the end devices coupled to the ports of the data forwarders can communicate with each other, wherein the message comprises a membership distribution message received in response to being discovered by the controlling switch;

receiving a zone distribution message identifying all the ports in the data forwarders coupled to the controlling switch communicating in the one large zone and including a peering entry for each of the ports on the data forwarders, wherein the peering entry for each of the ports includes a flag indicating that entries for other of the ports on the data forwarders are not listed;

determining whether the message indicates that a short message format is supported;

generating an accept response indicating that the short message format is supported in response to determining that the message indicates that the short message format is supported; and returning the accept response to the controlling switch.

17. The system of claim 16, wherein the message comprises a first message, wherein the accept response comprises a first accept response, wherein the operations further comprise:

communicating with the controlling switch on a first port directly linked to a port on the controlling switch;

communicating with a second data forwarder on a second port linked to a port on the second data forwarder, wherein the second data forwarder port is directly connected to a port on the controlling switch;

sending a second message to the second data forwarder indicating that the short message format is supported;

receiving a second accept response from the second data forwarder indicating including a field of information to indicate whether the short message format is supported; and sending a reachability message to the controlling switch identifying the second data forwarder and indicating whether the second data forwarder supports the short message format.

18. The system of claim 16, wherein the short message format comprises a peering descriptor having a plurality of peering entries corresponding to respective end devices coupled to respective ports of respective data forwarders in the one large zone; and wherein respective peering entries in the short message format do not identify respective peer ports to a respective port of a respective data forwarder to which an end device is connected for which a respective peering entry is provided.

19. A method performed by a controlling switch coupled to data forwarders having ports with which end devices are coupled in a network, comprising:

implementing one large zone for the end devices coupled to the ports of the data forwarders, wherein in the one large zone all the end devices coupled to the data forwarders can communicate with each other;

for each of the data forwarders coupled to the controlling switch, performing operations, the operations comprising:

determining whether the data forwarder supports a short message format, wherein the short message format comprises a peering descriptor having a plurality of peering entries corresponding to respective end devices coupled to respective ports of a respective data forwarder in the one large zone;

generating a first formatted zoning distribution message in the short message format identifying the data forwarder and ports on the data forwarders in the one large zone to which end devices are connected in response to determining that the data forwarder supports the short message format;

generating a second formatted zoning distribution message identifying the data forwarder and the ports on the data forwarders in the one large zone and additional fields of information on the ports on the data forwarders in the one large zone not included in the first formatted zoning distribution message in response to determining that the data forwarder does not support the short message format; and sending the generated first formatted or second formatted zoning distribution message to the data forwarder.

20. The method of claim 19, wherein the second formatted zoning distribution message includes for each of the ports in the one large zone on which an end device is connected a peering entry identifying each of other ports in the one large zone with which the end device on the port, for which the peering entry is provided, can communicate with in the one large zone.

21. The method of claim 20, wherein the first formatted zoning distribution message includes in the peering entry for each of the ports in the one large zone to which an end device is connected a flag indicating that the port for which the peering entry is provided can communicate with all ports in the one large zone having connected end devices; and wherein respective peering entries in the short message format do not identify respective peer ports to a respective port of the data forwarder to which an end device is connected for which a respective peering entry is provided.

22. The method of claim 19, further comprising:

maintaining, for each data forwarder coupled to the controlling switch, information indicating whether the data forwarder supports the short message format, wherein the data forwarder information is used to determine whether each data forwarder supports the short message format.

23. A method performed by data forwarders having ports with which end devices and a controlling switch are coupled in a network, comprising:

receiving a message from the controlling switch to communicate in a one large zone configuration, wherein in the one large zone all the end devices coupled to the ports of the data forwarders can communicate with each other, wherein the message comprises a membership distribution message received in response to being discovered by the controlling switch;

receiving a zone distribution message identifying all the ports in the data forwarders coupled to the controlling switch communicating in the one large zone and including a peering entry for each of the ports on the data forwarders, wherein the peering entry for each of the ports includes a flag indicating that entries for other of the ports on the data forwarders are not listed;

determining whether the message indicates that a short message format is supported;

generating an accept response indicating that the short message format is supported in response to determining that the message indicates that the short message format is supported; and returning the accept response to the controlling switch.

24. The method of claim 23, wherein the message comprises a first message, wherein the accept response comprises a first accept response, further comprising:

communicating with the controlling switch on a first port directly linked to a port on the controlling switch;

communicating with a second data forwarder on a second port linked to a port on the second data forwarder, wherein the second data forwarder port is directly connected to a port on the controlling switch;

sending a second message to the second data forwarder indicating that the short message format is supported;

receiving a second accept response from the second data forwarder indicating including a field of information to indicate whether the short message format is supported; and sending a reachability message to the controlling switch identifying the second data forwarder and indicating whether the second data forwarder supports the short message form.

25. The method of claim 23, wherein the short message format comprises a peering descriptor having a plurality of peering entries corresponding to respective end devices coupled to respective ports of respective data forwarders in the one large zone; and wherein respective peering entries in the short message format do not identify respective peer ports to a respective port of a respective data forwarder to which an end device is connected for which a respective peering entry is provided.

* * * * *